Jan. 15, 1935.  C. O. KNUUTI ET AL  1,987,959
WIRE CUTTING AND STRIPPING MACHINE
Filed Feb. 17, 1933   3 Sheets-Sheet 2
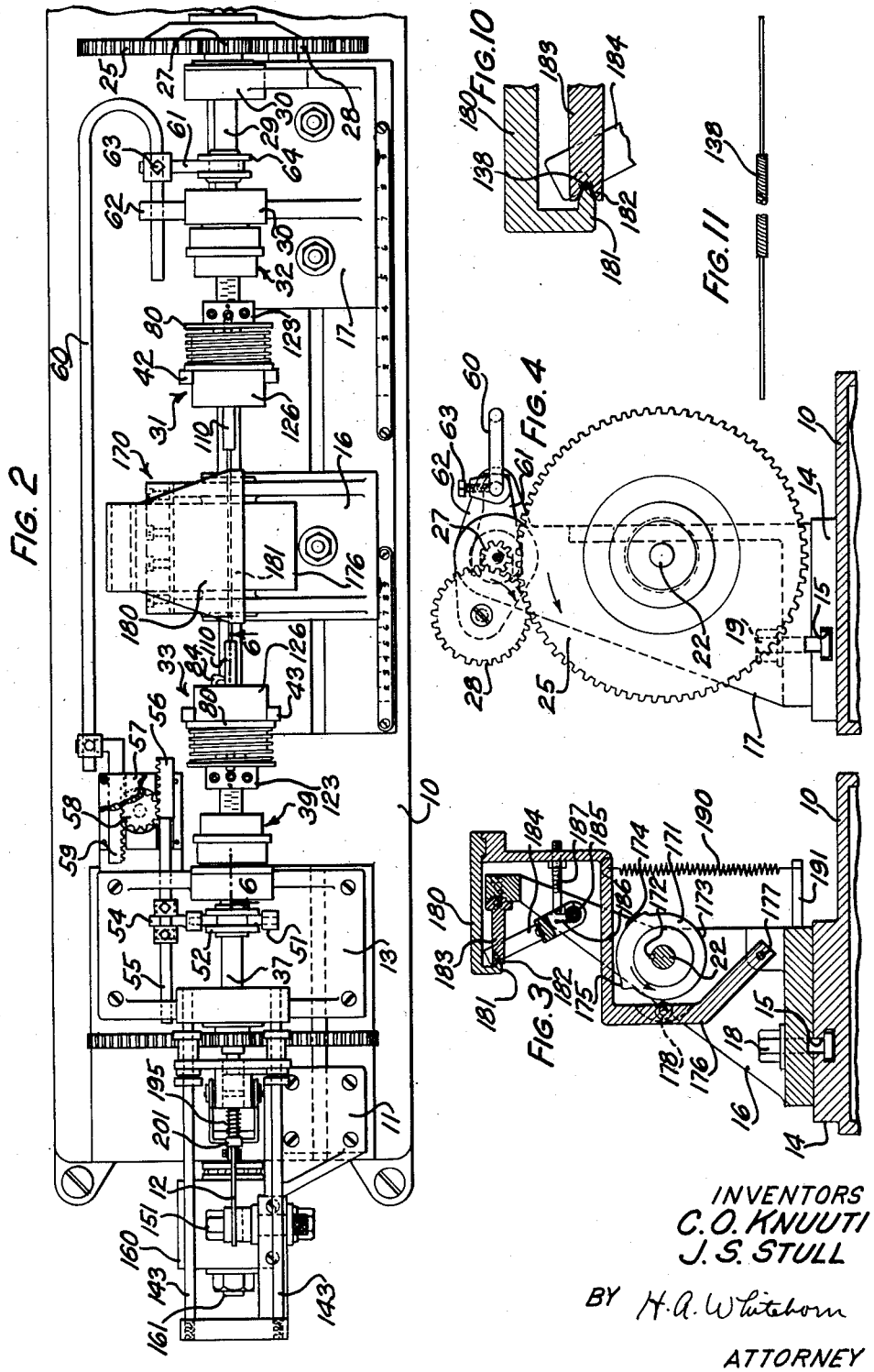
INVENTORS
C. O. KNUUTI
J. S. STULL
BY H. A. Whitehorn
ATTORNEY

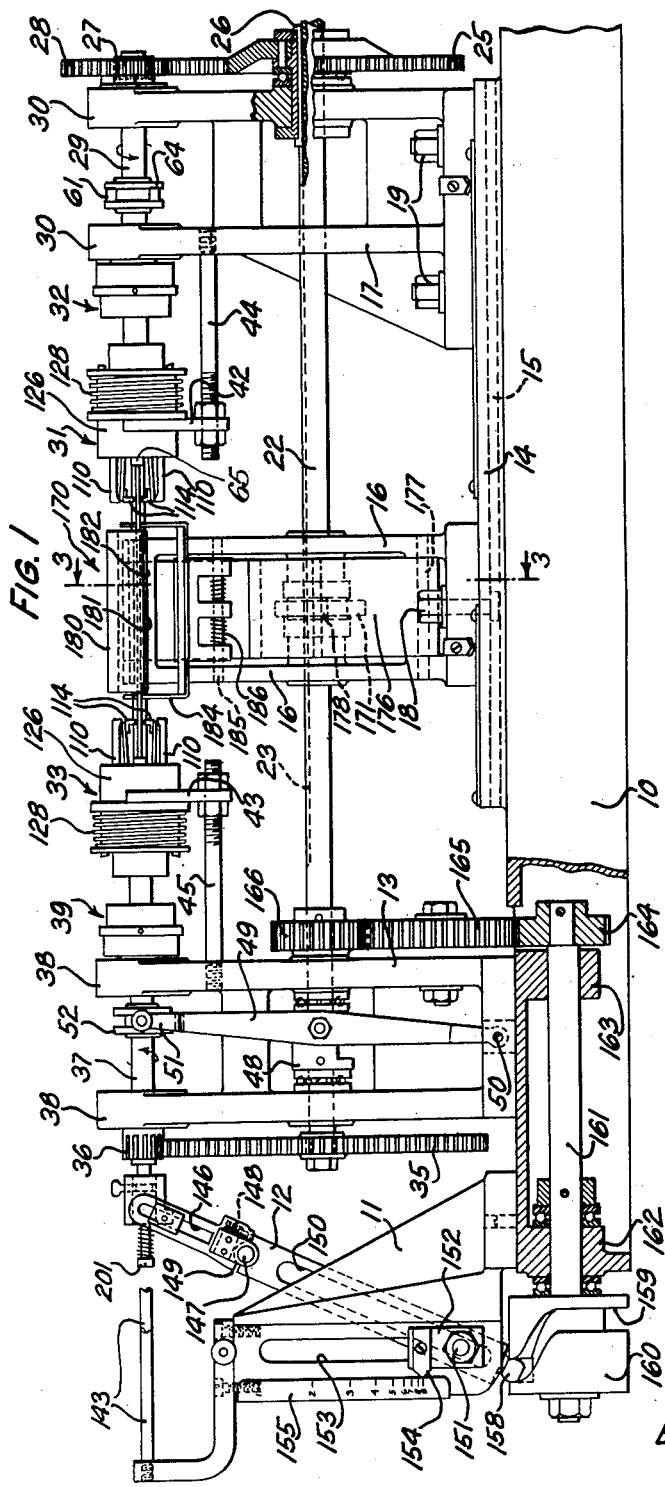

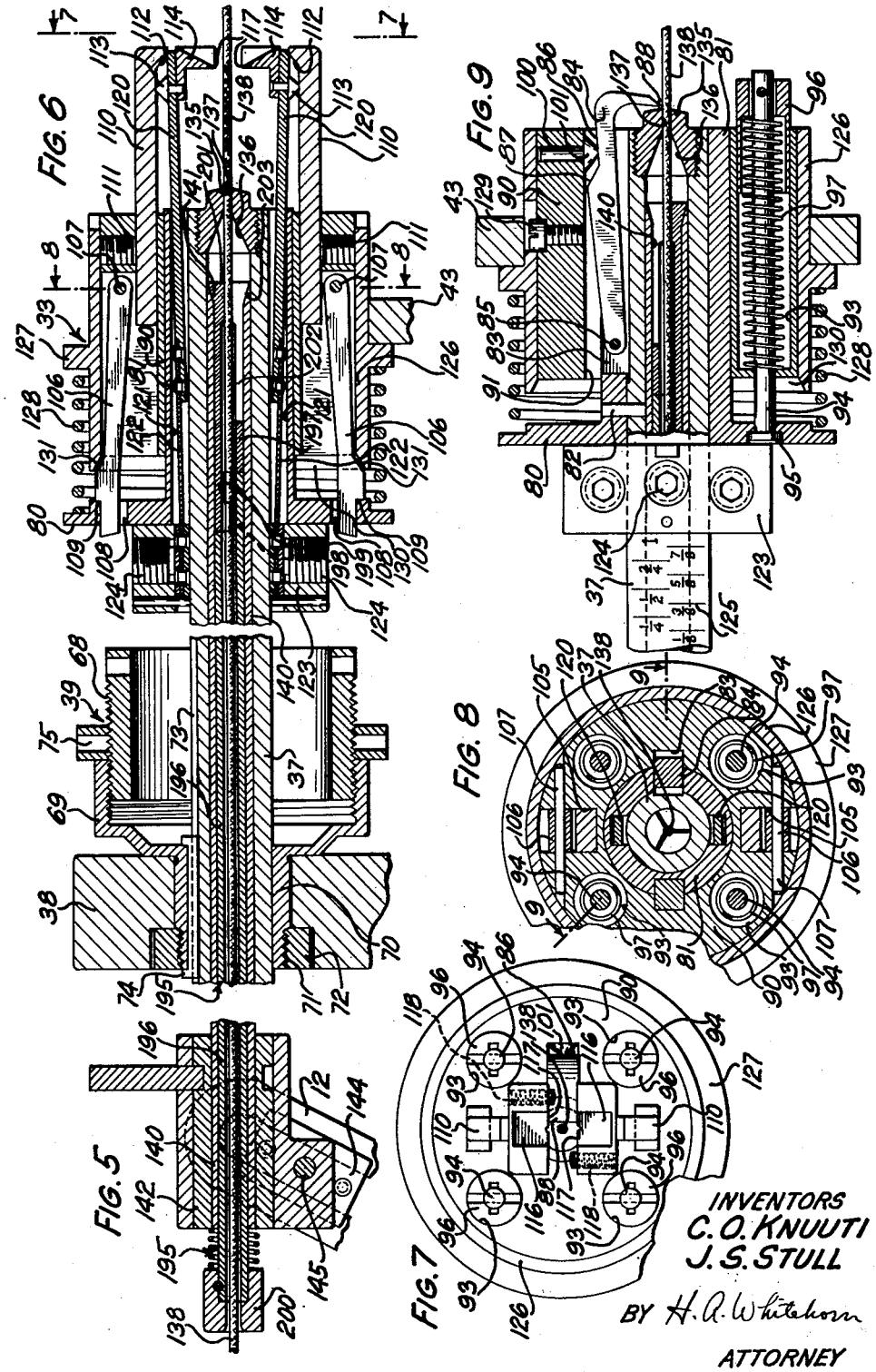

Patented Jan. 15, 1935

1,987,959

UNITED STATES PATENT OFFICE 1,987,959

WIRE CUTTING AND STRIPPING MACHINE

Charles O. Knuuti, Berwyn, and John S. Stull, Chicago, Ill., assignors to Western Electric Company, Incorporated, New York, N. Y., a corporation of New York Application February 17, 1933, Serial No. 657,240

18 Claims. (Cl. 81—9.51)

This invention relates to a wire cutting and stripping machine and more particularly to a machine for cutting insulated wire into predetermined lengths and for stripping predetermined portions of the insulation from opposite ends thereof.

An object of the invention is to provide an improved machine for removing covering material from spaced portions of a covered strand.

In accordance with one embodiment, the invention contemplates a wire cutting and stripping machine, comprising means for intermittently advancing an insulated wire a predetermined distance, including guides and releasable jaws through which the wire is advanced, means for severing the advanced portion of the wire, a pair of rotary and reciprocable stripping units having cutting blades movable transversely of the wire for severing the insulation simultaneously at points predeterminedly spaced from opposite ends thereof and movable longitudinally thereof for stripping the severed portions of the insulation while the wire is held stationary, and means for removing the wire from the jaws after the stripping operation. Means is provided for varying the length of the severed portions of the wire and the length of the insulation on opposite ends thereof which is to be stripped.

Other objects and advantages of the invention will be apparent from the following detailed description taken in conjunction with the accompanying drawings, wherein Fig. 1 is a front elevational view, partly in section, of a machine embodying the feature of the invention;

Fig. 2 is a top plan view of the machine;

Fig. 3 is a sectional view taken along the line 3—3 of Fig. 1;

Fig. 4 is an end elevational view of the machine taken from the right of Fig. 1;

Fig. 5 is an enlarged fragmentary sectional view of a portion of the wire feeding mechanism;

Fig. 6 is an enlarged sectional view taken substantially along the line 6—6 of Fig. 2, showing one of the stripping units;

Fig. 7 is an elevational view of one end of the stripping unit shown in Fig. 6 taken substantially along the line 7—7 of Fig. 6;

Fig. 8 is a sectional view taken along the line 8—8 of Fig. 6;

Fig. 9 is a sectional view of the stripping unit shown in Fig. 6, the section being taken substantially along the line 9—9 of Fig. 8;

Fig. 10 is an enlarged fragmentary view of the clamping members shown in Fig. 3, and Fig. 11 is a plan view of a portion of wire after the insulation has been stripped from the ends thereof by the machine.

Referring now to the drawings, wherein like reference numerals designate the same parts throughout the various views, a supporting base is indicated at 10 upon which is mounted a plurality of brackets, one bracket indicated at 11 being fixed to the supporting base at the left end thereof for pivotally supporting a wire feeding arm 12. Adjacent the bracket 11 is disposed a bearing bracket 13 which is fixed to the base 10 for a purpose hereinafter described. The right half of the supporting base 10, shown in Fig. 1, has a raised portion 14 grooved longitudinally, as indicated at 15, for adjustably supporting a clamping bracket 16 and a bearing bracket 17. Brackets 16 and 17 are held against movement by suitable means, such as bolts 18 and 19, respectively, the heads of which are receivable in the groove 15 to permit aligned adjustment of the brackets 16 and 17 relative to each other as well as relative to the bracket 13.

A drive shaft 22 provided with a key slot 23 therein, extending for the greatest portion of its length, extends through the brackets 13, 16 and 17 and is rotatably journaled therein. The drive shaft 22 may be driven in a counterclockwise direction, looking from the right (Fig. 1), by any suitable power means (not shown). Mounted upon the shaft 22 at the right end of the bearing bracket 17 is a gear 25, operatively connected to the shaft through a key 26 receivable in the key slot 23 and also operatively connected to a pinion 27 through an idler gear 28 (Fig. 4). The pinion 27 is fixed to a hollow shaft 29 which is journaled in upper bearing portions 30 of the bracket 17 and extends to the left to receive a stripping unit 31 and a resetting member 32, both of which are fixed to and rotatable with the hollow shaft.

The end of the drive shaft 22 adjacent the bracket 13 has a gear 35 fixedly mounted thereupon which engages a pinion 36. The pinion 36, similar to the pinion 27, is mounted upon a hollow shaft 37, which extends through bearing portions 38 of the bracket 13 and through a resetting member 39 and a stripping unit 33. The stripping units 31 and 33 are limited in their movement toward each other by yokes 42 and 43, respectively, which are adjustably carried by rods 44 and 45, respectively, the outer ends of which are respectively secured to the brackets 17 and 13.

The stripping units 31 and 33 are actuated during their continuous rotation by a mechanism operatively connected to the drive shaft 22. This mechanism consists of a cam 48 fixedly mounted upon the shaft 22 and arranged to actuate a shifting lever 49, the lower end of which is pivoted at 50 within the base of the bracket 13 while the other end is formed into a yoke 51 and operatively connected to a collar 52, which is disposed concentric with and secured to the hollow shaft 37. The mechanism for imparting longitudinal movement to the hollow shaft 37 is operatively connected to the hollow shaft 29 by an arm 54 extending outwardly from the shifting lever 49 and adjustably secured to a laterally extending portion 55 of a rack 56. The rack 56 is slidable in a housing 57 where its teeth interengage a pinion 58 rotatably mounted in the housing. Slidable in the housing 57 is another rack 59, the teeth of which also interengage the pinion 58. A looped rod 60 has one end connected to the rack 59 and the other end passing through a yoke 61 and a guide 62, the guide being carried by one of the bearing portions 30 of the bracket 17. The yoke 61 is adjustably secured to the rod 60 at 63 and is operatively connected to a collar 64 fixed to the hollow shaft 29.

In view of the fact that the stripping unit 31 and the mechanism associated therewith is substantially identical in construction to the stripping unit 33, with its associated mechanism, detailed views of the stripping unit 33 have been shown in the drawings, and a description of this stripping unit with its cooperating parts will apply equally well to the stripping unit 31. The difference between the two stripping units is that the stripping unit 33 is equipped with a cutting knife for cutting the wire into predetermined lengths together with wire feeding means slidably disposed in its hollow shaft 37 and a guide threaded in the right end of the hollow shaft whereas the stripping unit 31 does not have a cutting knife nor a wire feeding means but has a stop member 65 threaded in the left end of the hollow shaft 29 to limit the movement of the insulated wire when advanced.

Referring now to the specific construction of the stripping unit 33 and its cooperating elements, attention is directed to Figs. 6 to 9, inclusive, where it will be observed that the resetting member indicated generally at 39 consists of an externally threaded cylindrical member 68 adjustably receivable in an internally threaded hub member 69 which has a reduced portion 70 rotatably receivable in the adjacent bearing portion 38 of the bracket 13. The end of the reduced portion 70 is threaded as at 71 to receive a nut 72 for holding the hub member 69 against lateral movement. A key-way 73 is formed in the hollow shaft 37 for receiving a key 74 carried by the reduced portion 70 for connecting the hollow shaft to the hub member 69 and yet permit longitudinal movement of the hollow shaft relative to the hub member. A similar key-way is provided for the pinion 36 to connect the pinion to the hollow shaft and yet permit longitudinal movement of the hollow shaft relative to the pinion. A ring nut 75 is disposed concentric with the cylindrical member 68 and arranged to abut the edge of the hub 69 for securing the cylindrical member in any desired adjusted position.

The stripping unit 33 consists of a head member 80 having a laterally projecting tubular portion 81 disposed concentric with the hollow shaft 37 and fixed thereto by any suitable means, such as a pin 82. The tubular portion 81 has a longitudinally extending groove 83 therein in which is disposed a cutting knife 84, pivoted at 85 and having a cutaway portion 86 merging into a tapered surface 87. The outer end of the cutting knife 84 is bent transversely and terminates in a cutting edge 88 which is normally positioned slightly above the center line of the hollow shaft 37.

Slidable upon the tubular portion 81 of the head member 80 is a collar 90, cut away at 91 to allow sufficient space for the movement of the cutting knife 84. At equally spaced positions in the collar 90, apertures 93 are provided, which are closed at their left ends (Fig. 9) with the exception of openings sufficiently large to receive spring pins 94. The spring pins 94 have heads 95 receivable in recesses in the head member 80 while the opposite ends of the spring pins 94 have spring caps 96 fixed thereto and arranged to receive ends of springs 97 disposed concentric with the spring pins and having their opposite ends abutting the closed ends of the apertures 93.

A pin 100 having a conical shaped head 101 is carried by the collar 90, the head being positioned to engage the tapered surface 87 of the cutting knife 84 so as to actuate the cutting knife in a manner hereinafter described.

At diametrically opposed positions grooves 105 are formed in the collar 90 in which are disposed latches 106 (Figs. 6 and 8) which are pivoted at 107 and extend to the left (Fig. 6) through apertures 108 in the head member 80. The latches 106 have shoulders 109 positioned short of the ends thereof for engaging the inner wall of the head member 80 to hold the collar 90 and the head member at spaced positions for a purpose hereinafter described. Knife actuating fingers 110 are adjustably disposed in slots in the collar 90 and are held in adjusted positions by set screws 111. The outer ends of the fingers 110 have inwardly tapered surfaces 112 into engagement with which conical shaped members 113 may be moved for moving stripping knives 114 toward each other.

The stripping knives 114 have their central portions 116 tapered inwardly (Figs. 6 and 7) to cutting edges 117, which are provided with semi-circular grooves as shown in Fig. 7 adjacent the centers thereof for surrounding the core of an insulated wire during a stripping operation without severing the core. Set screws 118 carried by the stripping knives 114 provide adjustable stops for limiting the movement of the knives toward each other. The knives 114 are secured to rigid members 120 which extend to the left (Fig. 6) in grooves 121 in the tubular portion 81 of the head member 80 where they are secured to resilient members or springs 122 positioned between the hollow shaft 37 and an adjustable ring or collar 123 where they are held in place by set screws 124. The springs 122 urge the stripping knives 114 away from each other so as to hold the conical shaped members 113 in engagement with the fingers 110. Graduations, indicated generally at 125, are disposed upon the hollow shaft 37 and by adjusting the ring 123 with the springs 122 upon the hollow shaft relative to these graduations, the length of the portion of insulation to be stripped from each end of a wire may be varied.

Disposed concentric with the collar 90 is a sleeve 126 having an outwardly projecting annular flange 127 arranged to engage the yoke 43 at one side thereof. In engagement with the other side of the flange 127 is a compression spring 128, the opposite end of which engages the head member 80 for normally urging the sleeve 126 away from the head member. The sleeve 126 is held against rotation relative to the collar 90 by a screw 129, carried by the collar and having its head disposed in an elongated slot in the sleeve to permit relative axial movement. The left end of the sleeve 126 has an inwardly tapered surface 130 arranged to engage tapered surfaces 131 of the latches 106 to move the shoulders 109 of the latches out of engagement with the wall of the head member 80.

The hollow shaft 37 has a wire guide 135 threaded in the right end thereof (Fig. 6), which guide has a conical shaped aperture 136 therein extending from an aperture 137, which is of sufficient size to receive an insulated wire 138, to the inner wall of the hollow shaft. A tubular member 140 is slidably disposed in the hollow shaft 37 and has its inner or right end tapered inwardly, as at 141, from the outer diameter of the tubular member to the inner diameter thereof, as shown in Fig. 6. The tubular member 140 extends to the left through the hollow shaft 37 and through a reciprocating member 142 to which it is secured. The reciprocating member 142 is movably mounted upon horizontally disposed supporting rods 143 (Figs. 1 and 2), which guide and support the reciprocating member in its horizontal movement during the feeding of the wire 138 to the stripping units. The upper portion of the wire feeding arm 12 is connected to the reciprocating member 142 by a block 144 which is pivotally secured to the reciprocating member, as at 145, and slidably carried by the upper portion of the feeding arm in a groove 146. As shown in Fig. 1 the upper portion of the feeding arm 12 is pivotally secured at 147 to the lower portion and is normally urged in a counterclockwise direction about the pivot by a spring 148, this movement being limited by cooperating stop portions 149. The lower portion of the feeding arm 12 has a longitudinally extending slot 150 therein which receives a pivot pin 151, the pivot pin being carried by an adjusting block 152. The pivot pin 151 is adjustable in the slot 150 of the lower portion of the feeding arm 12 and the block 152 is movable vertically in a slot 153 in the bracket 11, so as to vary the length of the swinging stroke of the feeding arm 12 by varying the position of the pivot 151 relative to the lower end of the feeding arm. A pointer 154 is carried by the block 152 and disposed adjacent a scale 155 for the purpose of securing desired adjustments of the pivot 151. The lower end of the feeding arm 12 has a ball shaped member 158 carried thereby which rides in a groove 159 of a drum cam 160, the drum cam being mounted upon one end of a cam shaft 161. The cam shaft 161 extends through bearing portions 162 and 163 of the supporting base 10 and has a pinion 164 mounted upon the other end thereof. The pinion 164 is operatively connected to the drive shaft 22 by an idler gear 165 disposed in engagement therewith and in engagement with a pinion 166 which is mounted upon and fixed to the shaft 22. Therefore, the feeding arm 12 is actuated intermittently during the rotation of the drive shaft 22 for feeding predetermined lengths of wire to the stripping units 31 and 33.

A clamping unit indicated generally at 170 is carried by the bracket 16 and is arranged to clamp and to hold the insulated wire 138 midway between the stripping units 31 and 33 during the stripping operations. This clamping unit consists of a cam 171 (Figs. 1 and 3) disposed upon the shaft 22 between upwardly extending portions of the bracket 16 and connected to the shaft by a key 172 which is receivable in the key slot 23. The cam 171 has a low portion 173, a high portion 174, and an ejecting portion 175. A lever 176 is pivoted at 177 to the bracket 16 and has a cam roller 178 carried thereby and positioned to engage the cam 171. The lever 176 has a portion extending over the cam 171 and upwardly to a clamping member 180. The clamping member 180 is fixed at one end to the lever 176 by any suitable means (not shown) and has its free end extending downwardly and inwardly as at 181 where it is receivable in a groove 182 of a clamping member 183 (Fig. 10).

The groove 182 of the clamping member 183 is positioned in alignment with the path of advancement of the insulated wire 138 so that the wire when advanced will pass through the groove. The clamping member 183 is fixedly mounted upon the upper end of the bracket 16 in any suitable manner (not shown). An ejecting member 184 is pivoted at 185 to the bracket 16 and extends transversely as shown in Fig. 3 to a position adjacent the path of advancement of the wire 138, so that movement of the ejecting member in a counterclockwise direction, when the clamping member 180 is in open position, will eject the wire from the groove 182 of the clamping member 183. A spring 186 normally urges the ejecting member 184 into engagement with an adjustable stop 187 carried by the lever 176, and a spring 190 having one end secured to the lever 176 and the other end secured to a pin 191 carried by the bracket 16 normally urges the lever 176 toward the cam 171, thus normally moving the clamping member 180 into closed engagement when permitted by the cam 171.

In feeding the wire 138 to the machine, it may be taken from a supply reel (not shown) and advanced through a wire feeding member indicated generally at 195 which is tubular in general contour and slidably disposed in the sleeve 140. The wire feeding member 195 is formed of two parts 196 and 197 joined at their adjacent ends by interlocking heads 198 and 199. The portion 196 of the wire feeding member 195 (Fig. 5) is provided with a head 200 while the portion 197 has resilient jaws 201 formed by an elongated slot 202 so that the resilient jaws may be moved into and out of gripping relation with the wire 138. The jaws 201 are flared outwardly adjacent their ends providing tapered surfaces 203 positioned to engage the tapered surface 141 of the sleeve 140. The wire feeding member 195 is formed of two portions so that the portion 197 may be changed at will to accommodate various sizes of insulated wire which is to be stripped.

During the operation of the machine the shaft 22 is continuously rotated causing a continuous rotation of the hollow shafts 29 and 37 as well as the cams 48, 160 and 171. Let it be assumed that the insulated wire 138 is fed through the wire feeding member 195 to a position where the forward end of the wire will terminate adjacent the outer end of the guide 135. Even through the cams 48, 160 and 171 are rotated continuously, they are so arranged that the feeding arm 12 will be actuated to advance the wire a predetermined distance to pass the forward end thereof through the stripping unit 33, the groove 182 in the clamping member 183 and to the stop in the end of the hollow shaft 29 of the stripping unit 31, after which the cam 171 will release the lever 176 so as to allow the clamping member 180 to move into engagement with the wire at which time the cam 48 will actuate the lever 49 to set in operation the stripping units 31 and 33.

Upon considering the operation of the machine more in detail, let it be assumed that the wire feeding arm 12 is in its farthest position to the left (Fig. 1) and that the ball member 158 of the arm is in what might be called the low or right portion of the groove 159. As soon as the feeding arm 12 begins its movement to the right, or in a clockwise direction, the sleeve 140 is moved relative to the wire feeding member 195 until the tapered surface 141 rides upon the outwardly flared surfaces 203 of the gripping jaws 201, causing the jaws to move inwardly and grip the wire 138. Therefore, the wire is gripped by the jaws 201 at the instant the sleeve 140 begins its movement to the right and during the remainder of the movement of the sleeve 140 to the right, by the movement of the feeding arm 12, the wire feeding member 195 is moved in unison therewith moving also the wire 138 a predetermined distance. The distance in which the wire 138 is moved determines the length of the portions which are to be cut therefrom and of course the clamping unit 170 and the stripping unit 31 are adjusted relative to the stripping unit 33 to receive these lengths of wire.

As soon as the wire has been advanced, during which advancements the wire passes through the groove 182 in the clamping member 183 until its forward end is adjacent the stop member 65 of the stripping unit 31, the cam 171 has rotated a sufficient distance in a counterclockwise direction to allow the cam roller 178 to pass from the high portion of the cam 174 to the low portion 173 at which time the spring 190 moves the lever 176 about its pivot 177 and forces the end 181 of the clamping member 180 into intimate engagement with the wire in the groove 182 so as to hold it against movement.

The wire is thus clamped midway between the ends of the guides 135 of the stripping units and as soon as the wire is thus clamped the wire feeding arm 12 is moved in a counterclockwise direction to release the jaws 201 from the wire 138 and move the wire feeding member 195 to the left while the wire is held by the clamping member 170. When the wire feeding member 195 reaches the end of its movement to the left the cam 48 moves the actuating arm 49 in a clockwise direction, causing movement to the right of the hollow shaft 37 and through the actuation of the racks 56 and 59 with the pinion 58 causes a movement to the left of the hollow shaft 29. The movement of the hollow shafts 37 and 29 toward each other brings about a movement of the head members 80, which are fixed to the hollow shafts, together with the collars 90 relative to the sleeves 126 of the stripping units 31 and 33, the sleeves 126 being held against movement toward each other by the yokes 42 and 43. During this movement the latches 106 of each stripping unit have their tapered surfaces 131 forced into engagement with the tapered walls 130 of the sleeves 126 causing the latches to be moved inwardly until the shoulders 109 thereof are moved out of engagement with the inner walls of the head members 80 allowing the springs 97, the combined force of each set of which is greater than the force of each spring 128, to move the collars 90 toward the head members 80. During the movement of the collar 90 relative to the head member 80 of the stripping unit 33 the conical shaped head 101 of this stripping unit is moved upon the tapered surface 87 of the knife 84 causing the knife to be moved about its pivot 85 a sufficient distance to move the cutting edge 88 through the wire 138, thus cutting a portion of predetermined length from the wire. As stated in the foregoing, the stripping units 31 and 33 are substantially identical in construction, one of the differences being that the stripping unit 33 is provided with the cutting knife 84 for cutting the portions from the wire, whereas no knife is needed for this purpose in the stripping unit 31. The movement of the collars 90 of the stripping units 31 and 33 relative to the head members 80 move the knife actuating fingers 110 toward the head members 80 until the tapered surfaces 112 engage the conical shaped heads 113 and move them with the stripping knives 114 of each stripping unit toward and into engagement with each other. The movement of the stripping knives of each stripping unit into engagement with each other forces the cutting edges of the knives through the insulation of the insulated wire 138 allowing the semi-circular grooves of the stripping knives to surround the core thereof. Therefore, during the slight movement of the hollow shafts 37 and 29 toward each other the knife 84 of the stripping unit 33 cuts a portion from the insulated wire and the stripping knives of both of the stripping units are moved into stripping positions and cut the insulation at predetermined points upon the portion of wire. During a further rotation of the cam 48, the actuating arm 49 is moved to the left or in a counterclockwise direction a predetermined distance, moving with it the hollow shaft 37 together with the hollow shaft 29, through the actuation of the racks 56 and 59 and the pinion 58. During this movement of the cam 48 the hollow shafts 37 and 29 are moved away from each other, moving with them their respective stripping units 33 and 31, causing the stripping knives 114 of each stripping unit to strip the insulation from the core of the portion of wire held by the clamping unit 170, thus simultaneously stripping the insulation from the ends of this portion of wire.

The resetting members 32 and 39 are so positioned with respect to their stripping units 31 and 33, that after the insulation has been stripped from the ends of the portion of wire, the outer ends of the latches 106, which are shown in Fig. 6 as being slightly tapered inwardly, will engage the adjacent ends of the cylindrical members 68 forcing the collars 90 toward each other; that is, away from their respective head members 80, until the shoulders 109 of the latches are free to move into engagement with the inner walls of the head members to hold the stripping units in set or open positions. The movement of the collars 90 of the stripping units 31 and 33 away from their respective head members 80, brings about movement of the actuating fingers 110 of each stripping unit, relative to their respective stripping knives so that the stripping knives may be moved away from the wire and positioned for the advancement of the wire 138 for the next stripping operation.

After the insulation has been stripped from the ends of the portion of wire held by the clamping unit 170, the ejecting portion 175 of the cam 171 (Fig. 3) is moved into engagement with the cam roller 178 forcing the lever 176 about its pivot 177 and against the tension of the spring 190 to move the clamping member 180 away from the clamping member 183 and simultaneously forcing the ejecting member 184 in a counterclockwise direction about its pivot 185 to force the stripped portion of wire from the groove 182 of the clamping member 183. After the portion of wire has been ejected from the clamping unit 170, the roller 178 rides upon the high portion 174 of the cam 171 to hold the clamping member 180 in open position away from the clamping member 183 a length of time sufficient to allow another advancement of the wire a predetermined distance.

Therefore, during the continuous rotation of the drive shaft 22, the wire 138 is advanced a predetermined distance, by the actuation of the feeding arm 12, through the rotation of the cam 160, after which the wire is clamped by the clamping unit 170 and immediately following the clamping of the wire, the wire feeding member 195 is moved to the left relative to the wire, after which the cam 48 actuates the lever 49 to move the hollow shafts 37 and 29 toward each other to release the stripping units 31 and 33. Upon the releasing of the stripping units, which is brought about by moving the latches 106 free of their respective head members 80, a portion of the wire is severed at the end of the guide 135 of the stripping unit 33 and simultaneously with the severing of the wire the stripping knives 114 of each stripping unit are moved into engagement with each other to sever the insulation of the portion of the wire at predetermined distances from the ends thereof. Immediately following this operation, the hollow shafts 37 and 29 are moved in opposite directions, moving with them their respective stripping units 33 and 31 and causing the stripping knives 114 to simultaneously strip the insulation from the ends of the severed portion of wire, after which the latches 106 of each stripping unit are moved into engagement with their respective resetting members to move the latches into the positions shown in Fig. 6 and move the cutting knife 84 together with the stripping knives 114 of each stripping unit into open position.

The insulation upon most all wire, where the insulation is served thereto, is in spiral formation due to the present systems of serving the insulating material to the wire, and by rotation of the stripping units in opposite directions so as to rotate in and not against the direction of winding of the insulation, the insulation may be more easily cut and stripped from the wire without unwrapping, loosening or interrupting the insulation remaining upon the wire.

Although only one preferred embodiment of the invention has been illustrated and described herein, it will be understood that the invention is capable of other adaptations and is to be limited only by the scope of the appended claims.

What is claimed is:

1. In a machine for stripping covering material from a strand, a rotatable stripping member having an axial aperture for the passage of a covered strand therethrough, means for advancing a covered strand through said aperture, means for receiving and holding the strand against movement during the actuation of the stripping member, and means for rotating the stripping member and moving it longitudinally of the held strand to remove covering material therefrom.

2. In a machine for stripping covering material from a strand, spaced rotatable stripping members for engaging spaced portions of a covered strand, means for rotating said stripping members, and means for simultaneously moving said stripping members longitudinally of the strand in opposite directions to strip covering material from spaced portions of the strand.

3. In a machine for stripping spirally wrapped covering material from a strand, spaced rotatable stripping members for engaging spaced portions of a covered strand, means for rotating said stripping members in opposite directions, and means for simultaneously moving said stripping members in opposite directions longitudinally of the strand to strip the covering material from spaced portions of the strand.

4. In a wire stripping machine, spaced rotatable stripping members, means for advancing a portion of an insulated wire axially of said stripping members, means for receiving and holding the advanced portion, means carried by one of the stripping members for severing said advanced portion, and means for rotating said stripping members and moving them in opposite directions longitudinally of said held severed portion to remove insulation from the ends thereof.

5. In a wire stripping machine, a rotatable member having an axial aperture for the passage of an insulated wire therethrough, a stripping element carried by the member and movable radially thereof, means for advancing a portion of an insulated wire through said aperture, means for receiving and holding the advanced portion of the wire against movement during the actuation of the stripping element, and means for rotating the member and moving the same longitudinally of the wire to cause a radial and longitudinal movement of the stripping element to strip insulation from said portion.

6. In a stripping machine, means for gripping an insulated wire, means for imparting reciprocatory movement to said gripping means for advancing the insulated wire a predetermined distance, rotary stripping units, means for rotating said stripping units, a cutting knife carried by one of said stripping units, a stripping knife carried by each of said stripping units, means for actuating said knives during the rotation of said stripping units to cut a portion of predetermined length from said insulated wire and cut the insulation at points predeterminedly spaced from the ends of said portion, and means for moving said stripping units longitudinally of the wire for causing the stripping knives to strip the insulation from the ends of said portion.

7. In a stripping machine, means for gripping insulated wire, means for imparting reciprocatory movement to said gripping means for advancing the insulated wire a predetermined distance, rotary stripping units, means for rotating said stripping units, a cutting knife carried by one of said stripping units, a stripping knife carried by each of said stripping units, means for actuating said knives during the rotation of said stripping units to cut a portion of predetermined length from said insulated wire and cut the insulation at points predeterminedly spaced from the ends of said portion, means for moving said stripping units longitudinally of the wire for causing the stripping knives to strip the insulation from the ends of said portion, clamping means for holding the severed portion of wire against movement during the stripping of the insulation from the ends thereof, and means for ejecting the severed portion of wire from said clamping means.

8. In a stripping machine, a stripping unit, means for holding a portion of insulated wire against movement, a stripping knife carried by said stripping unit, means for urging said stripping knife away from the insulated wire, means for rotating said unit with said stripping knife, and means for moving said stripping knife into engagement with the wire for cutting the insulation and for moving the stripping knife longitudinally of the wire to strip the insulation therefrom during the rotation of said stripping unit.

9. In a wire stripping machine, a rotatable element, a stripping knife rotatable with said element, a knife actuating member rotatable with said element and said knife and movable relative thereto, means for holding said knife actuating member against movement relative to said element and said knife, means for releasing said holding means, means for positioning an insulated wire adjacent said knife, and means for moving said knife actuating member relative to said element and said knife for moving said knife into engagement with the wire to cut the insulation thereon.

10. In a wire stripping machine, a rotatable element, a stripping knife rotatable with said element, a knife actuating member rotatable with said element and said knife and movable relative thereto, means for holding said knife actuating member against movement relative to said element and said knife, means for releasing said holding means, means for positioning an insulated wire adjacent said knife, means for moving said knife actuating member relative to said element and said knife for moving said knife into engagement with the wire to cut the insulation thereon, and means for moving said knife longitudinally of the insulated wire for stripping the insulation therefrom.

11. In a wire stripping machine, a rotatable element, a pair of stripping knives rotatable with said element, a knife actuating member rotatable with said element and said knives and movable relative thereto for moving said knives toward each other, means for holding said knife actuating member against movement relative to said element and said knife, means for releasing said holding means, means for positioning an insulated wire between said knives, means for moving said knife actuating member relative to said knives for moving said knives into engagement with the wire to cut the insulation thereon, and means for moving said knives longitudinally of said insulated wire for stripping the insulation therefrom.

12. In a wire stripping machine, a pair of spaced stripping units comprising elements rotatable in opposite directions, a stripping knife rotatable with each of said elements, a knife actuating member rotatable with each of said elements and movable relative to the respective knives, means for holding said knife actuating members against movement relative to the respective elements and knives, means for releasing said holding means, means for positioning an insulated wire so that the ends thereof will extend beyond said stripping knives, means for moving said knife actuating means relative to the respective knives for moving said knives into engagement with the wire to cut the insulation thereon during their rotation in opposite directions, and means for moving said stripping knives longitudinally of the insulated wire for stripping the insulation from spaced portions thereof.

13. In a wire stripping machine, a rotatable element, a stripping knife rotatable with said element, a knife actuating member rotatable with said element and said knife and movable relative thereto, means for holding said knife actuating member against movement relative to said element and said knife, means for releasing said holding means, means for positioning an insulated wire adjacent said knife, means for moving said knife actuated means relative to said element and said knife for moving said knife into engagement with the wire to cut the insulation thereon, means for moving said knife longitudinally of the insulated wire for stripping the insulation therefrom, and means for moving said knife actuating means in another direction for rendering effective said holding means after the insulation has been stripped from said wire.

14. In a wire stripping machine, a stripping unit, stripping knives carried by said stripping unit, means for moving said stripping unit into closed position for moving said stripping knives relative to each other to move them into engagement with an insulated wire for cutting the insulation thereon, means for positioning an insulated wire between said stripping knives, a latch for holding said stripping unit in open position for holding said stripping knives at spaced positions away from the insulated wire, means for releasing said latch for rendering effective said closing means for moving said stripping knives into cutting position and means for moving said stripping unit longitudinally of the insulated wire for causing said stripping knives to strip the insulation therefrom.

15. In a wire stripping machine, a pair of stripping units rotatable in opposite directions, means for advancing insulated wire to said stripping units, means positioned between said stripping units for clamping the insulated wire and holding it against movement, stripping knives carried by said stripping units, a wire cutting knife carried by one of said stripping units, means for actuating said stripping units simultaneously for actuating said wire cutting knife for cutting a portion of predetermined length from the insulated wire and for moving said stripping knives into engagement with the wire at positions predeterminedly spaced from the ends thereof to cut the insulation thereon, and means for moving said stripping units relative to each other for causing said stripping knives to strip the insulation from the ends of the severed portion of the insulated wire.

16. In a machine for stripping covering material from a strand, a rotatable stripping member for engaging a covered strand disposed axially thereof, means for rotating said stripping member, means for simultaneously moving said stripping member longitudinally of the strand to strip a portion of the covering material of predetermined length from the strand, and means for varying the longitudinal movement of said stripping member for varying the length of the portion of covering material stripped from the strand.

17. In a wire stripping machine, spaced rotatable stripping members, means for advancing an insulated wire axially of said stripping members, means for gripping a wire at a position between said stripping members to hold it against longitudinal movement, and means for subsequently actuating said stripping members for moving them away from said gripping means while rotating for stripping insulation from the ends thereof.

18. In a wire stripping machine, spaced rotatable stripping members, means for advancing a supply of insulated wire axially of said stripping members, means for gripping the wire at a position between said stripping members to hold it against longitudinal movement, a cutting knife rotatable with one of said stripping members, means for actuating said cutting knife for cutting the held portion of wire from the supply, and means for subsequently actuating said stripping members for moving them away from said gripping means while rotating for stripping insulation from the ends of the portion of wire.

CHARLES O. KNUUTI.
JOHN S. STULL.